Patented Feb. 12, 1924.

1,483,587

UNITED STATES PATENT OFFICE.

GERALD H. MAINS, OF DETROIT, MICHIGAN, DEDICATED, BY MESNE ASSIGNMENTS, TO THE CITIZENS OF THE UNITED STATES.

VARNISH AND PAINT REMOVING COMPOSITION AND PROCESS FOR USING THE SAME.

No Drawing.   Application filed February 23, 1923.   Serial No. 620,822.

(FILED UNDER THE ACT OF MARCH 3, 1883, 22 STAT. L., 625.)

*To all whom it may concern:*

Be it known that I, GERALD H. MAINS, a citizen of the United States of America, and an employee of the Department of Agriculture, residing in the city of Detroit, county of Wayne, State of Michigan (whose post-office address is Department of Agriculture, Washington, D. C.), have invented new and useful Varnish and Paint Removing Compositions and Processes for Using the Same, of which the following is a specification.

This application is made under the act of March 3, 1883, chapter 143 (22 Stat., 625), and the invention herein described and claimed is hereby dedicated to the free use of the Government and the public without payment to me of any royalty thereon.

This invention relates to a varnish and paint removing composition and to a process for using this composition for the removing of varnish, paint, and similar coatings from surfaces.

In the art of removing varnish and paint a number of compositions have been developed. Most of these have had the objection that either the solvent was too volatile and hence evaporated before sufficient time could elapse to exert proper solvent action, or if the solvent was less volatile it was of such a corrosive nature as to produce injurious effects on the materials treated or on the person using the solvent.

On vertical, sharply inclined, or inverted surfaces there is the additional difficulty that even solvents of low volatility drain from the surface by gravity, and hence do not leave a sufficient layer of solvent to insure dissolving action on the paint or varnish film. A number of processes have been devised to overcome this difficulty. Probably the most successful of these is one in which a composition is used containing wax in solution in a solvent or mixture of solvents. When the composition is applied evaporation takes place from the surface of the liquid layer leaving a film of wax which delays the evaporation of the remainder of the liquid. A disadvantage of this process is that when the loosened paint or varnish coat and composition residue is scraped off, there is often left a small portion of the wax ingredient which interferes with the application of fresh coats of varnish or paint to the surface.

Pat. No. 1,381,485, discloses a process of removing paint and varnish by the use of furfural, $C_4H_3O.CHO$, as a solvent. This solvent has a very low vapor pressure at room temperature, and is a very efficient remover of paint and varnish films. This solvent fulfills the condition of slow evaporation and hence works well on horizontal surfaces. The furfural, however, tends to run off from inclined and vertical surfaces as do other solvents, and hence necessitates repeated application in these cases to obtain satisfactory results.

I have now invented a method for maintaining furfural and similar powerful solvents of low volatility in contact with varnish and paint coatings on vertical surfaces for a sufficient length of time to insure the complete loosening of the paint and varnish coatings, and their ready and entire removal by brushing or light scraping of the surface. This is accomplished as follows: A paste is made by mixing furfural with an inert powder ingredient such as corn starch, using such proportions as to obtain as thick a paste as possible and yet have one that may be applied with a brush. The paste is applied to a varnish surface and allowed to remain for ten or twenty minutes. The outer portion of the paste will have dried out slightly, but the inner portion will be still moist with furfural.

Although the use of starch, wood flour, and other inert ingredients as stiffening agents has been suggested with certain liquids of low volatility in order to prevent their running from vertical or inclined surfaces, the liquids used have possessed the disadvantage of being either corrosive in nature, of slight solvent power, or of high cost.

I have found that furfuralcohol may be used as an effective solvent in removing paint and varnish films especially on horizontal surfaces. Furfuralcohol or furfuryl alcohol $C_4H_3O.CH_2OH$, is a derivative of furfural and may readily be prepared from it at low cost. It is a rather thick liquid, boiling point about 170° C., and is characterized by a very low vapor pressure at room temperature. For treating inclined and vertical varnished or painted surfaces the great solvent power and low volatility of furfuralcohol make possible the use of large proportions of inert stiffening agents, so that the solvent is maintained in contact with the paint and varnish coatings for a sufficient length of time to insure their complete loosening, and ready subsequent removal by brushing or light scraping.

By the use of a knife blade, scraper, stiff brush, cloth or other suitable means, the paste residue and loosened varnish film may be entirely removed, leaving the clean surface of the material. This surface is now ready for the application of a fresh coat of varnish or paint, there being no wax or other deposit to interfere. Varnish coats may be removed from wood by this method without harming the original surface in any way. Although the paste will remain moist for a long period of time, it should not be allowed to remain on the surface for so long a time as to be too dry for satisfactory removal. This method works successfully no matter what the position of the surface. It permits the ready removal of varnish from vertical, inclined, or inverted surfaces as well as from horizontal surfaces and is very economical of solvent material.

To remove paint from surfaces, especially where there are a number of coats present, a convenient method is to apply the furfural or furfuralcohol paste, allow it to remain about fifteen minutes, scrape off the loosened paint layer with a knife or stiff brush and then apply a second coat of the paste. After another fifteen minute period the surface is again scraped, and unless a very large number of paint coats are present, the surface is generally entirely clean. Where a very large number of paint coats are present a third application may be advisable.

This method has also given satisfactory results with shellaced and enameled surfaces. With highly baked enamels on metallic surfaces the scraping may have to be done with slightly greater effort and more than one application may be needed.

Whereas, I have described in detail the use of a paste made from furfural and corn starch or furfuralcohol and corn starch, I do not limit myself to these particular ingredients. Other powdered substances such as wood flour, diatomaceous earth, gum arabic, potato or rice starch, flour, and similar materials inert in nature and non-reactive with furfural or furfuralcohol may be used with furfural or furfuralcohol in the form of a paste to give good results in removing paint and varnish. I prefer, however, to use corn starch because it can be mixed with furfuralcohol to give a paste of very good consistency, and because it is at the same time a cheap and readily available ingredient.

Although furfural itself may be made into the starch paste and work satisfactorily for removing many types of surface coatings, a mixture of furfural and furfuralcohol as the liquid ingredient of the paste is advantageous in removing certain coatings, especially those containing large amounts of shellac or cellulose esters. Alcohol, benzine, acetone, turpentine, and many other organic solvents are not adapted to be used by themselves, as solvents in such a paste form, either because of their high volatility or low solvent action. They may, however, when mixed with substantial proportions of furfural or furfuralcohol serve as the liquid ingredients of the paste for purposes of removing paint and varnish. It is preferable, however, to use as the liquid ingredient of the paste furfural or furfuralcohol either alone or mixed with each other without the presence of other liquids. The technical grades of furfural and furfuralcohol containing some water may be used satisfactorily. For use on wood surfaces the technical grades should not be of a dark and inferior quality since resinous particles may be present to stain the wood surface after the varnish or paint is removed.

Furfural is now obtainable at a fairly low price and by using the paste made with it and the corn starch filler the method described in this specification permits the removal of varnish and paint from large areas at a very low cost, furfural has the further great advantage of not injuring the surface treated or the hands of the one applying it.

Having thus described my invention, I claim:

1. A varnish and paint removing composition, comprising a liquid ingredient whose chief component is furfuralcohol, and starch, mixed together to form a paste.

2. A varnish and paint removing composition comprising furfuralcohol and starch mixed together to form a paste.

3. A varnish and paint removing composition, comprising a liquid ingredient containing furfural and furfuralcohol as principal components, and starch mixed together to form a paste.

4. A process for removing paint and varnish from surfaces, consisting in applying to said surfaces a paste made up of a furfuralcohol-containing liquid ingredient and starch, in permitting said paste to remain upon said surfaces for a period sufficient to exert efficient solvent action but short enough so that the interior portion of the paste layer is still moist, and in subsequently removing from said surfaces the loosened paint and varnish together with the paste residue.

5. A varnish and paint removing composition consisting of a mixture of furfural and furfuralcohol.

In testimony whereof, I affix my signature in the presence of two subscribing witnesses.

GERALD H. MAINS.

Witnesses:
JOSEPH COHEN,
J. J. SHARP.